(12) United States Patent
Pierce

(10) Patent No.: US 12,336,520 B2
(45) Date of Patent: Jun. 24, 2025

(54) ICE FISHING TRAP DEVICE

(71) Applicant: Kurt Pierce, Swatara, MN (US)

(72) Inventor: Kurt Pierce, Swatara, MN (US)

(*) Notice: Subject to any disclaimer, the term of this patent is extended or adjusted under 35 U.S.C. 154(b) by 54 days.

(21) Appl. No.: 18/525,086

(22) Filed: Nov. 30, 2023

(65) Prior Publication Data

US 2025/0176519 A1 Jun. 5, 2025

(51) Int. Cl.
*A01K 97/01* (2006.01)
(52) U.S. Cl.
CPC ..................... *A01K 97/01* (2013.01)
(58) Field of Classification Search
CPC ...................................................... A01K 97/01
See application file for complete search history.

(56) References Cited

U.S. PATENT DOCUMENTS

| | | | |
|---|---|---|---|
| 3,722,940 A | 3/1973 | Misjak | |
| 5,218,777 A | 6/1993 | Olszowka | |
| 5,784,824 A * | 7/1998 | Myroniuk | A01K 77/00 43/4 |
| 6,694,662 B1 | 2/2004 | McClure | |
| 6,981,346 B1 | 1/2006 | Wiezycki | |
| 7,162,826 B1 * | 1/2007 | Zander | A01K 97/14 43/4 |
| 9,439,406 B1 | 9/2016 | Kuny | |
| 2018/0249694 A1 * | 9/2018 | Dresch | A01K 97/01 |
| 2019/0373878 A1 * | 12/2019 | Liebl | A01K 97/01 |

FOREIGN PATENT DOCUMENTS

CA          2003234        5/1990

\* cited by examiner

*Primary Examiner* — Richard G Davis

(57) ABSTRACT

A trap for confining a fish to an ice hole to facilitate successfully catching the fish includes an upper plate having an upper plate aperture. A shaft is movably coupled to the upper plate within the aperture. A trap plate is attached to the shaft. Rotation of the shaft moves the trap plate between open and closed positions. The upper plate is positionable adjacent to a hole extending through ice over a body of water. The shaft extends through the hole into the water. In the open position, the trap plate is aligned with the upper plate and positioned in the water. In the closed position, the trap plate is offset from the upper plate and positioned within the hole. A trigger assembly that rotates the shaft and moves the shaft upward includes a power source. A rotation mechanism rotates the trap plate. A lift mechanism lifts the trap plate.

17 Claims, 11 Drawing Sheets

ICE FISHING TRAP DEVICE

CROSS-REFERENCE TO RELATED APPLICATIONS

I hereby claim the benefit under 35 U.S.C. Section 119 (e) to Provisional Application No. 63/453,123, filed Mar. 19, 2023.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to traps and more particularly pertains to a new trap for confining a fish to an ice hole to inhibit the fish from escaping and facilitate successfully catching the fish.

(2) Description of Related Art Including Information Disclosed Under 37 CFR 1.97 and 1.98

The prior art relates to traps. Some traps have been designed for use while ice fishing. When ice fishing, the fisher has to first catch the fish on the fishing line hook. Then, the fisher has to maneuver the fish upwardly through the ice hole. Fish can often disconnect themselves from the hook and line as the fisher is trying to perform this maneuver, resulting in lost fish and fewer catches. Thus, there is a need in the art for a trap that can inhibit access to the body of water from the ice hole to facilitate the fisher in removing the fish from the water.

BRIEF SUMMARY OF THE INVENTION

An embodiment of the disclosure meets the needs presented above by generally comprising an upper plate having an upper plate aperture extending through the upper plate. A main shaft is positioned in the upper plate aperture. The main shaft is movably coupled to the upper plate whereby the main shaft moves vertically relative to the upper plate. A trap plate is coupled to the main shaft below the upper plate. Rotation of the main shaft rotates the trap plate 180.0° between an open position and a closed position. The trap plate is aligned with the upper plate when the trap plate is in the open position. The upper plate is configured to be positioned adjacent to an ice hole extending through an upper surface of ice over a body of water. The main shaft is configured to be positionable to extend through the ice hole into the body of water below the ice hole such that the trap plate is positioned in the body of water and aligned with the upper plate when the trap plate is in the open position. The trap plate is configured to be offset from the upper plate and positioned within the ice hole when the trap plate is in the closed position. A trigger assembly is mounted on the top side of the upper plate. The trigger assembly rotates the trap plate from the open position to the closed position and moves the main shaft upwardly relative to the upper plate. The trigger assembly may generally include a power source that is coupled to the upper plate. A rotation mechanism that is coupled to the power source is configured to rotate the main shaft whereby the trap plate is rotated to the closed position. A lift mechanism that is coupled to the power source is configured to lift the main shaft upwardly toward the upper plate when the trap plate is in the closed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
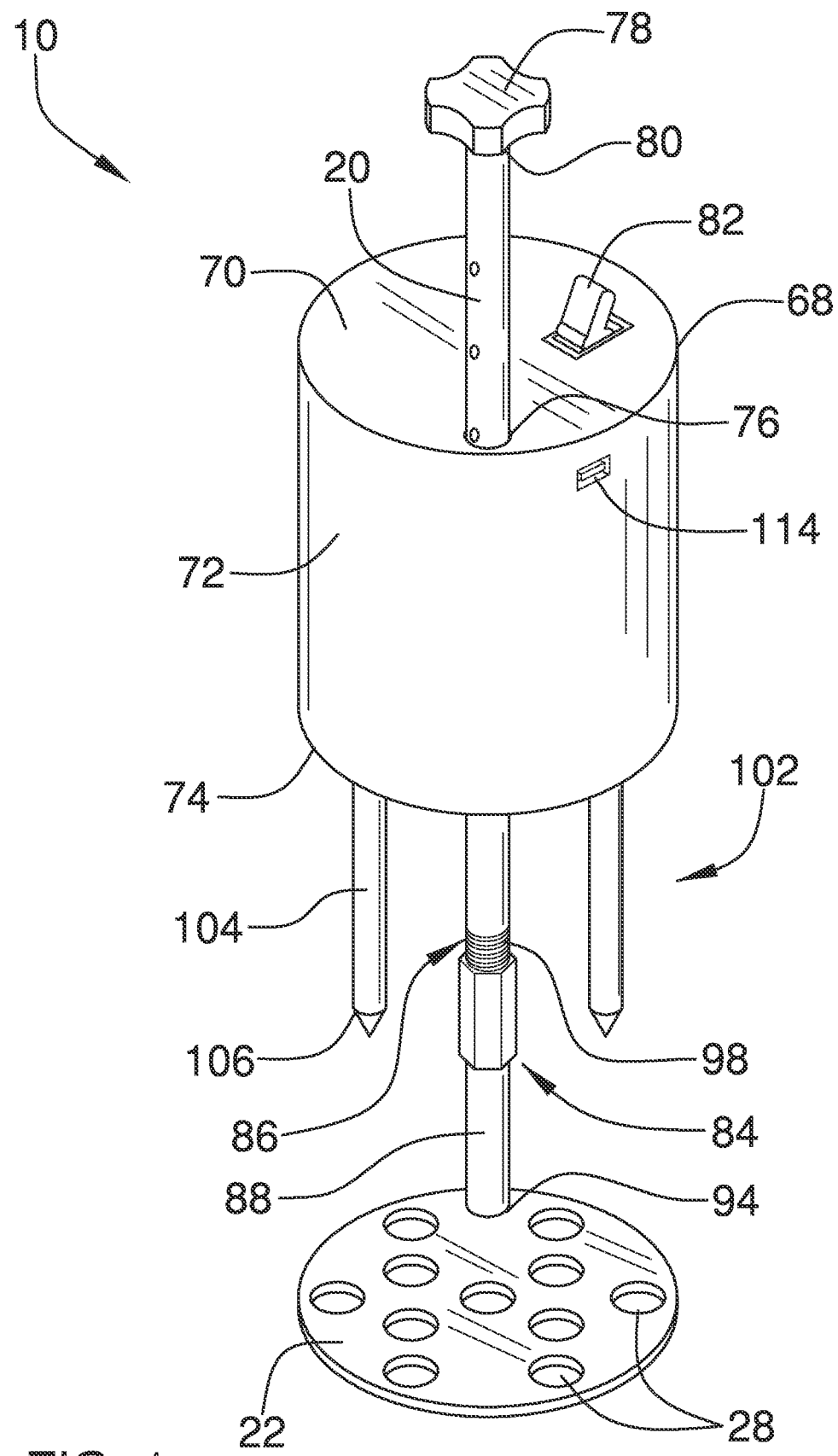
FIG. 1 is a top isometric view of an ice fishing trap device according to an embodiment of the disclosure.

With reference now to the drawings, and in particular to FIGS. 1 through 11 thereof, a new trap embodying the principles and concepts of an embodiment of the disclosure and generally designated by the reference numeral 10 will be described.

As best illustrated in FIGS. 1 through 11, the ice fishing trap device 10 generally comprises an upper plate 12 having a top side 14 and a bottom side 16. The upper plate 12 has an upper plate aperture 18 extending into the top side 14 and outwardly through the bottom side 16. In the examples depicted in the drawings the upper plate 12 is round, although the upper plate 12 may alternatively be other shapes, such as square or octagonal.

A main shaft 20 is positioned in the upper plate aperture 18. The main shaft 20 is movably coupled to the upper plate 12 whereby the main shaft 20 moves vertically relative to the upper plate 12 and rotates within the upper plate aperture 18.

Figure 2:
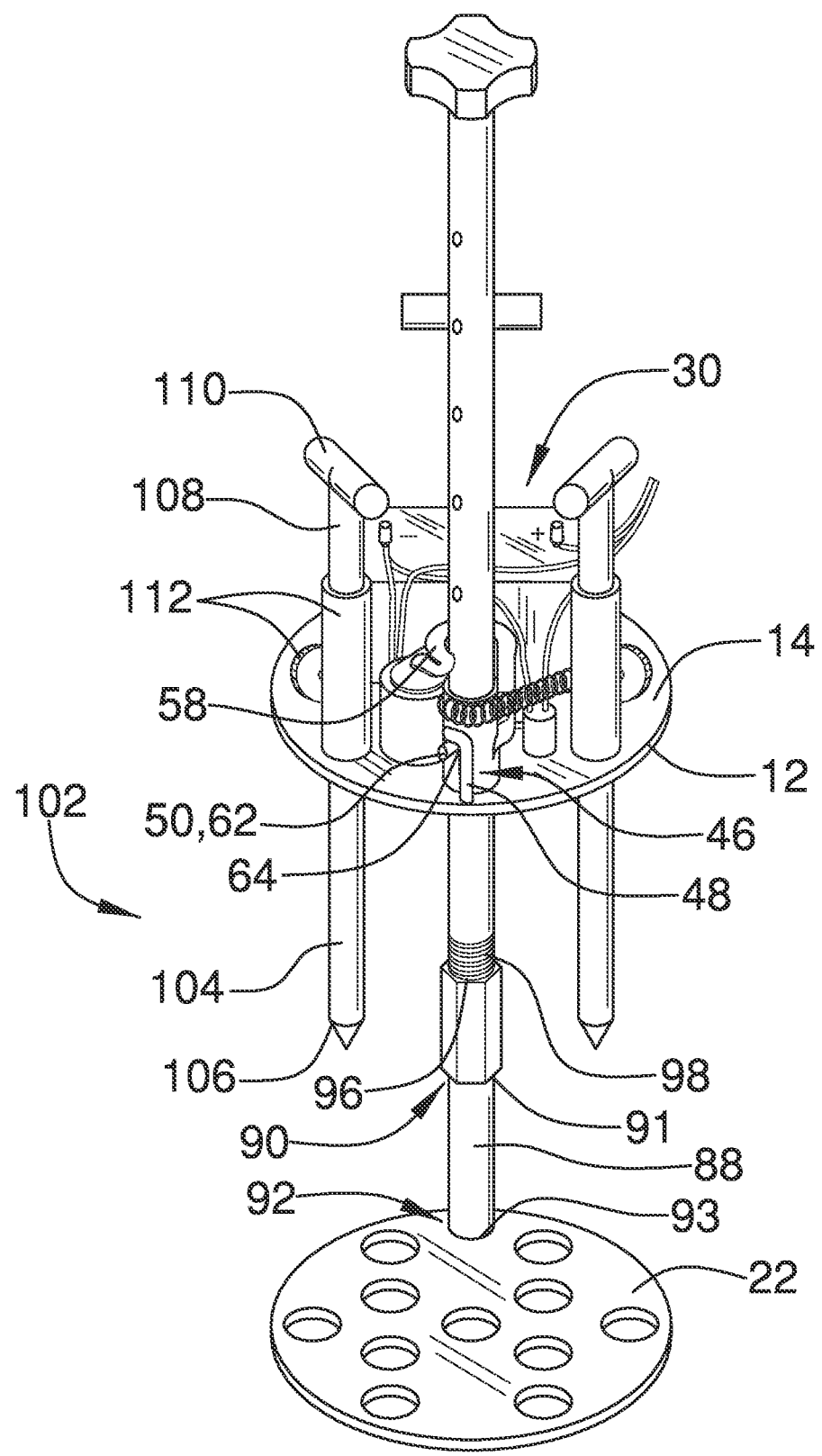
FIG. 2 is a top isometric view of an embodiment of the disclosure.
Figure 3:
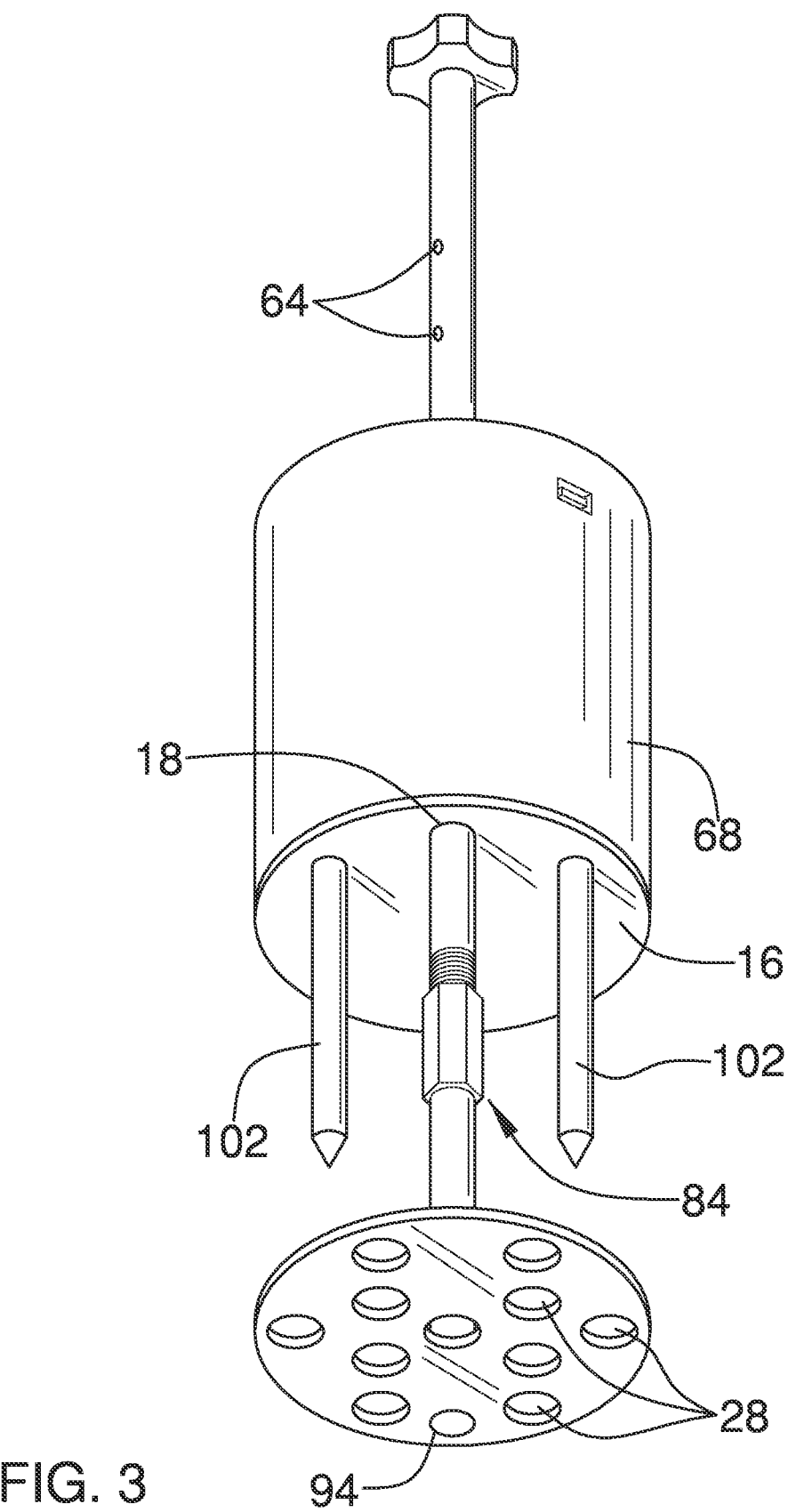
FIG. 3 is a bottom isometric view of an embodiment of the disclosure.
Figure 7:
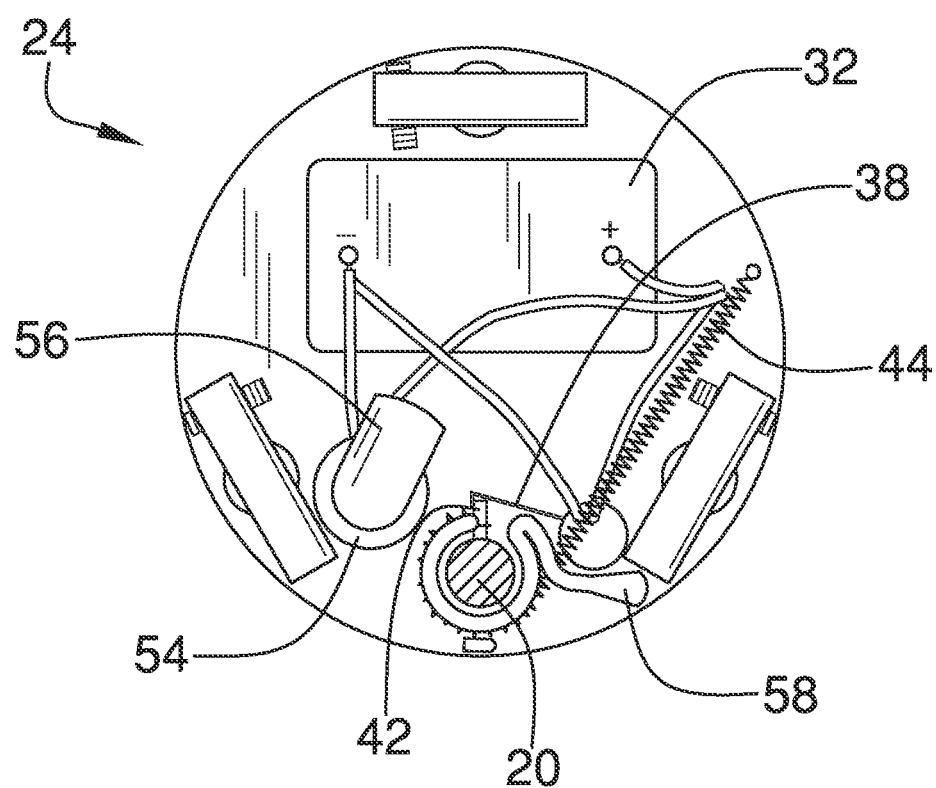
FIG. 7 is a top view of an embodiment of the disclosure.
Figure 8:
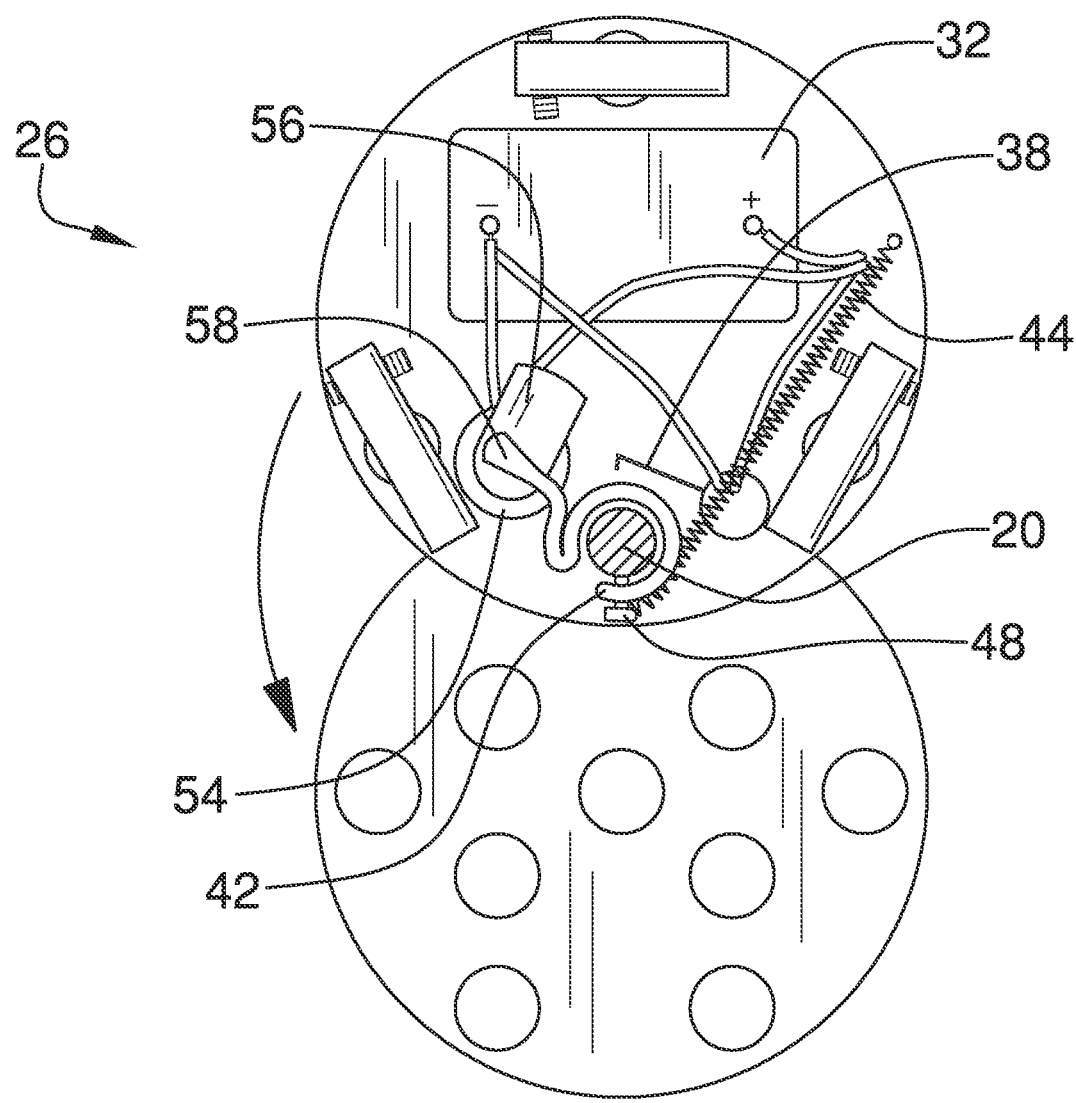
FIG. 8 is a top view of an embodiment of the disclosure.
Figure 9:
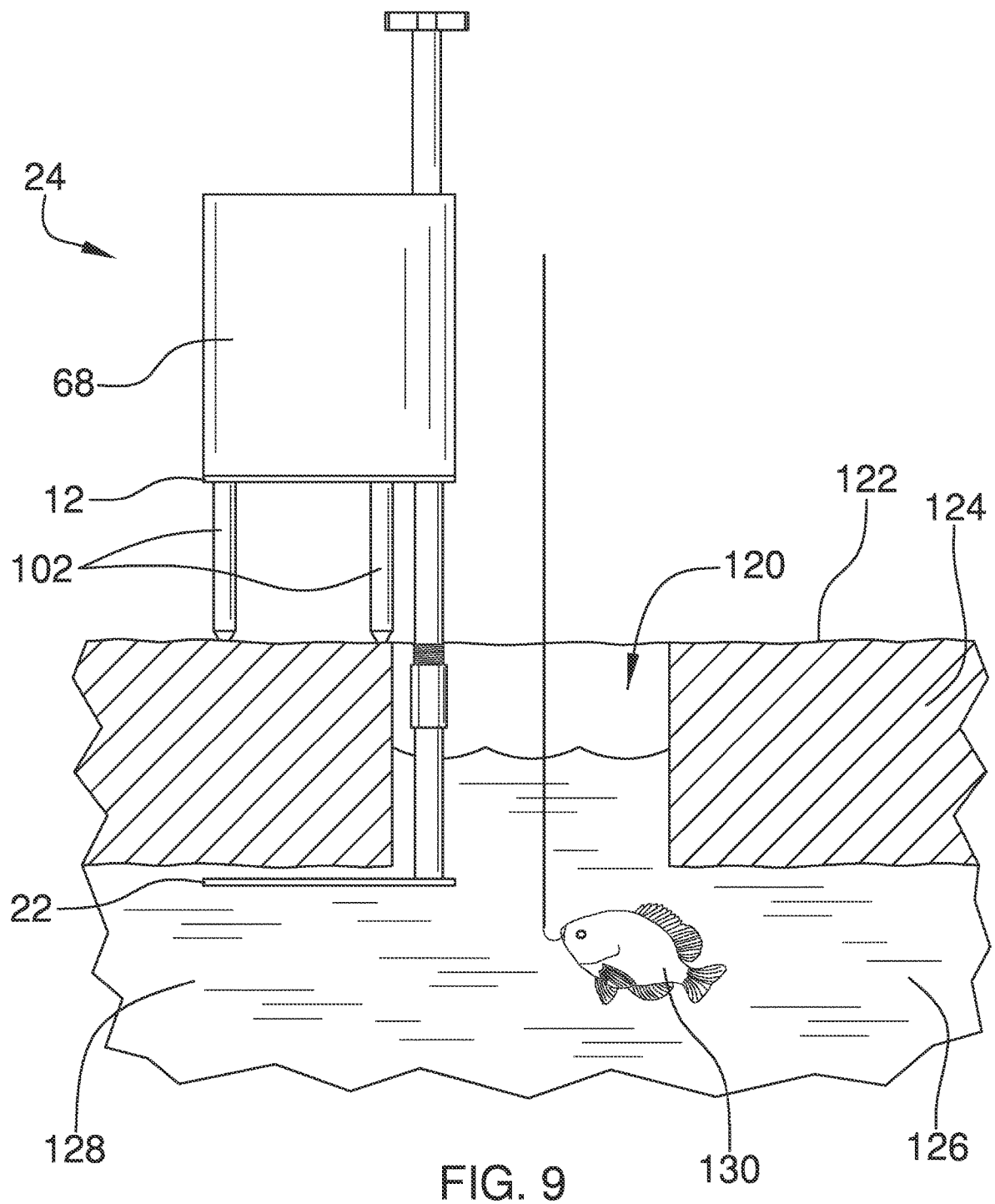
FIG. 9 is an in-use view of an embodiment of the disclosure.

A trap plate 22 is coupled to the main shaft 20 below the upper plate 12. The rotation of the main shaft 20 rotates the trap plate 22. The trap plate 22 rotates 180.0° between an open position 24 and a closed position 26. In the open position, the trap plate 22 is aligned with the upper plate 12, as shown in FIGS. 2, 7, and 9. In the closed position, the trap plate 22 is offset from the upper plate 12, as shown in FIGS. 8, 10, and 11.

Figure 10:
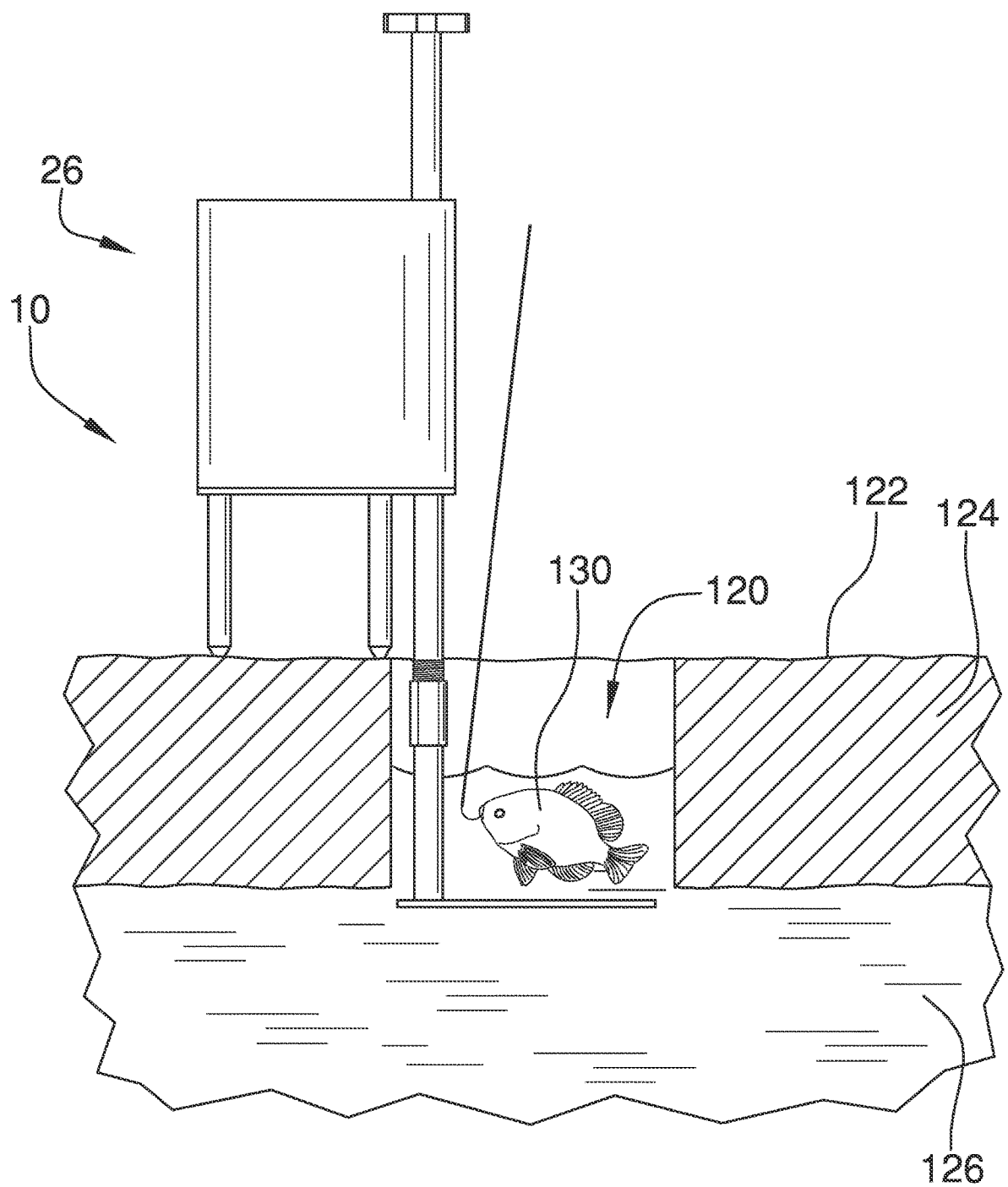
FIG. 10 is an in-use view of an embodiment of the disclosure.
Figure 11:
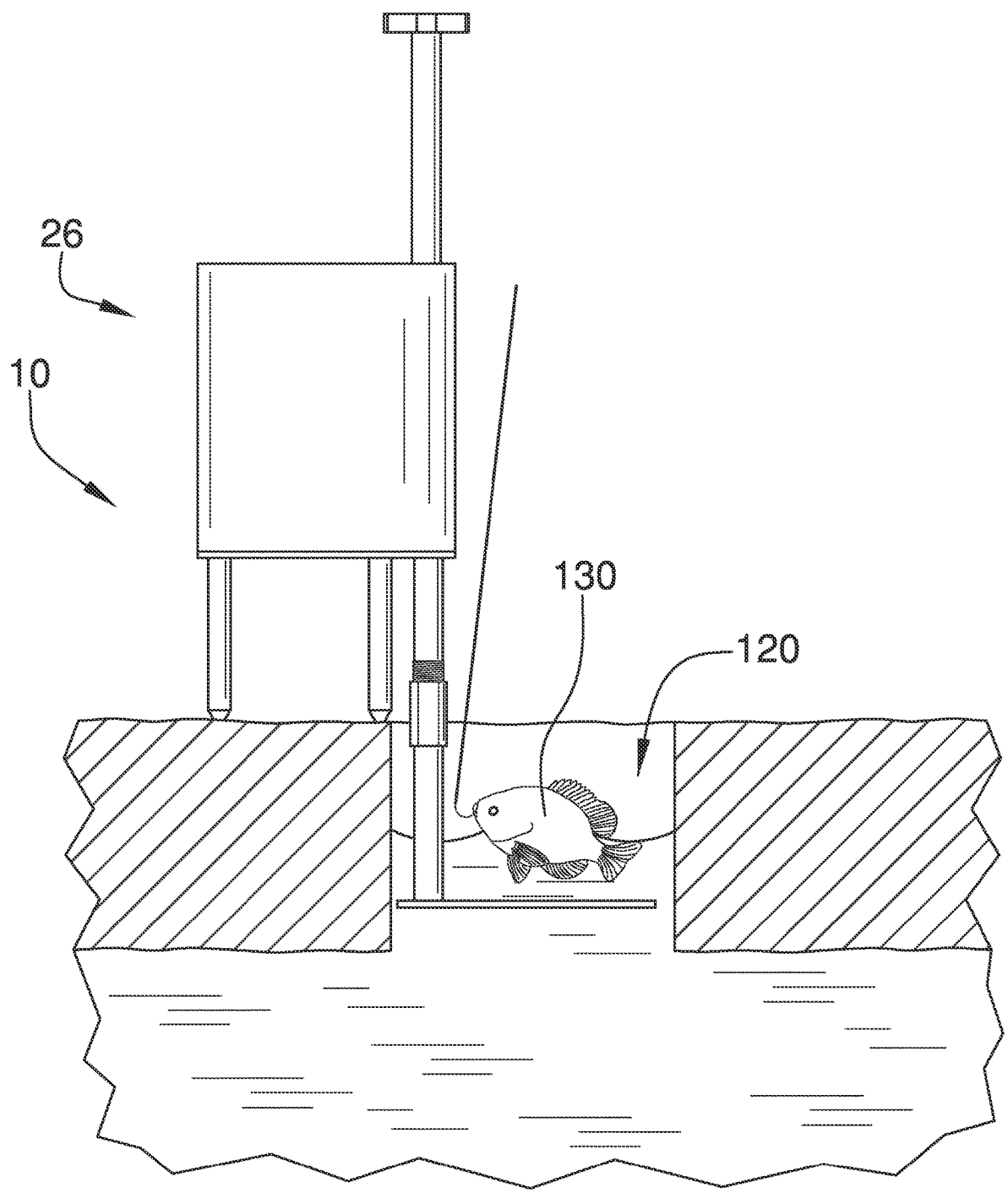
FIG. 11 is an in-use view of an embodiment of the disclosure.

The upper plate 12 is configured to be positioned adjacent to an ice hole 120 extending through an upper surface 122 of ice 104 over a body of water 126, as shown in FIGS. 9-11. The main shaft 20 is configured to be positionable to extend through the ice hole 120 into the body of water 126 below the ice hole 120 such that the trap plate 22 is positioned in the body of water 126 beneath the ice 104 and aligned with the upper plate 12 when the trap plate 22 is in the open position 24. The trap plate 22 is configured to be offset from the upper plate 12 and positioned within the ice hole 120 when the trap plate 22 is in the closed position 26.

The trap plate 22 may have a plurality of plate holes 28 extending through the trap plate 22. The plurality of plate holes 28 are generally configured to permit a fluid 128 to flow through the plurality of plate holes 28 when the trap plate 22 moves through the body of water 126.

A trigger assembly 30 is mounted on the upper plate 12. The trigger assembly 30 rotates the trap plate 22 from the open position 24 to the closed position 26 and moves the main shaft 20 upwardly relative to the upper plate 12.

The trigger assembly 30 may generally comprise a power source 32. In some embodiments, the power source is coupled to the top side 14 of the upper plate 12. For example, the power source 32 may be a rechargeable battery.

A rotation mechanism 34 is configured to rotate the main shaft 20 whereby the trap plate 22 is rotated to the closed position 26. The rotation mechanism 34 may generally include a rotation solenoid 36 that is coupled to the upper plate 12. The rotation solenoid 36 is actuated by the power source 32. A trigger 38 is coupled to the rotation solenoid 36. The trigger 38 extends outwardly from the rotation solenoid 36. A trigger sleeve 40 is coupled to the main shaft 20. The trigger sleeve 40 extends around the main shaft 20. A sleeve arm 42 is attached to and extends outwardly from the trigger sleeve 40. A spring 44 is coupled to the upper plate 12 and the sleeve arm 42. The spring 44 extends around the trigger sleeve 40 when the trap plate 22 is in the open position 24. The spring 44 is tensioned by the trigger 38 to retain the open position 24 until the rotation solenoid 36 is actuated.

Figure 5:
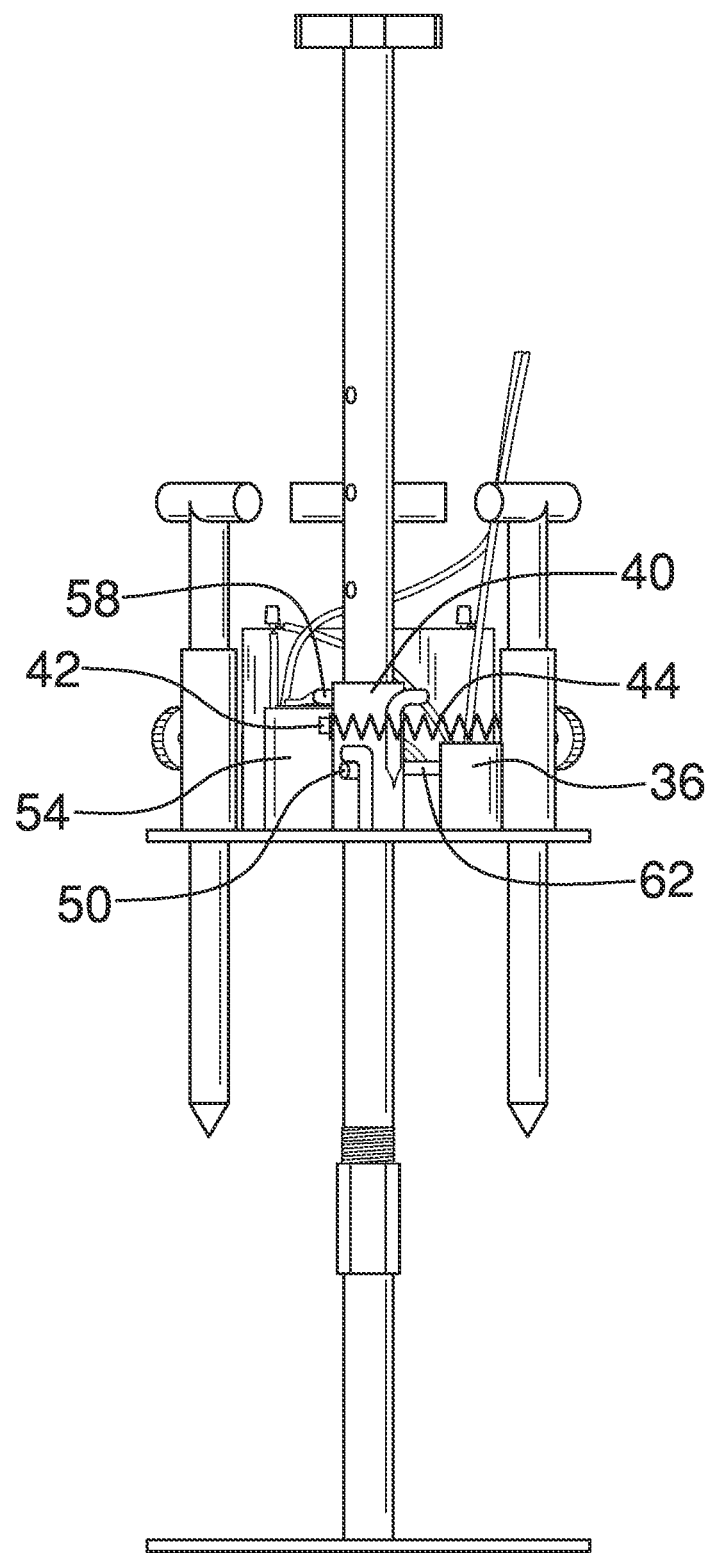
FIG. 5 is a front view of an embodiment of the disclosure.
Figure 6:
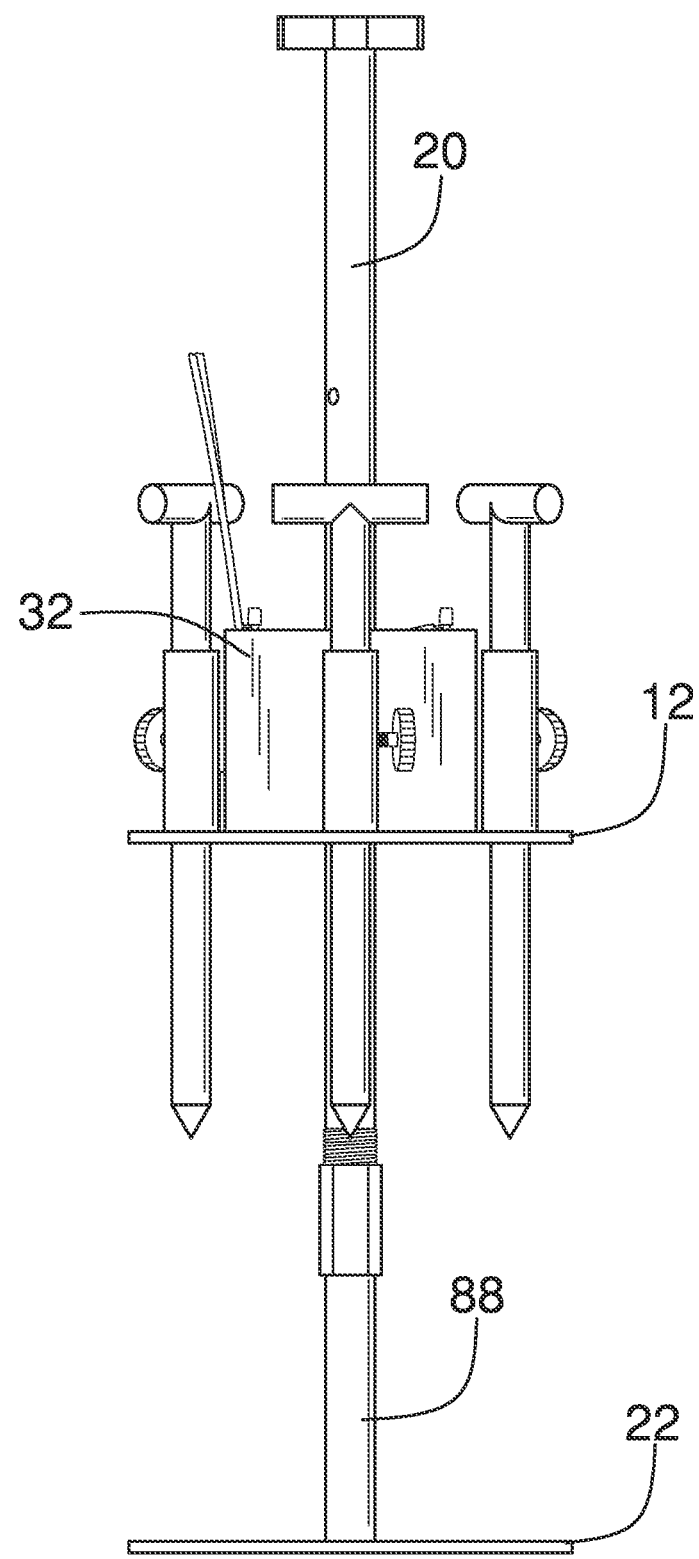
FIG. 6 is a rear view of an embodiment of the disclosure.

The trigger 38 contacts the spring 44 when the trap plate 22 is in the open position 24, as shown in FIGS. 5 and 7. As shown in FIG. 8, the rotation solenoid 36 releases the trigger 38 from the spring 44 thereby turning the main shaft 20 within the upper plate aperture 18 until the trap plate 22 reaches the closed position 26.

A stop 46 may be coupled to the upper plate 12 and the trigger sleeve 40 to inhibit the main shaft 20 from turning more than 180.0° when the rotation solenoid 36 releases the trigger 38 from the spring 44. The stop 46 may comprise a stop hook 48 that is coupled to and extends upwardly from the upper plate 12. A stop arm 50 is coupled to and extends outwardly from the trigger sleeve 40. The stop arm 50 is aligned with the stop hook 48 when the trap plate 22 is in the closed position 26. The stop arm 50 collides with the stop hook 48 to inhibit the main shaft 20 from turning once the trap plate 22 is in the closed position 26.

A lift mechanism 52 is configured to lift the main shaft 20 upwardly toward the upper plate 12 when the trap plate 22 is in the closed position 26. The lift mechanism 52 includes a lift solenoid 54 that is coupled to the upper plate 12. The lift solenoid 54 is actuated by the power source 32. A rod 56 is telescopically coupled to the lift solenoid 54. The rod 56 is nested within the lift solenoid 54 such that the rod 56 extends upwardly from the lift solenoid 54 when the lift solenoid 54 is actuated by the power source 32. A lift hook 58 is coupled to the main shaft 20. The lift hook 58 extends outwardly from the main shaft 20. The lift hook 58 is aligned with the rod 56 when the trap plate 22 is in the closed position 26. The rod 56 contacts and lifts the lift hook 58 thereby lifting the main shaft 20 upwardly toward the upper plate 12.

An attachment 60 couples the upper plate 12 to the main shaft 20. The attachment 60 releasably secures the upper plate 12 at a selected position relative to the main shaft 20. The attachment 60 may generally comprise a pin 62. The trigger sleeve 40 has a pin aperture 64 extending therethrough. The pin aperture 64 is configured to receive the pin 62.

The main shaft 20 has a plurality of pin holes 66 extending therethrough. The plurality of pinholes 66 are arranged along a length of the main shaft 20. Each of the plurality of pin holes 66 is configured to receive the pin 62 when a one of the plurality of pin holes 66 is aligned with the pin aperture 64. The plurality of pin holes 66 may be spaced relative to one another, for example by 2.0 inches. Insertion of the pin 62 through the pin aperture 64 and the one of the plurality of pin holes 66 releasably secures the upper plate 12 to the main shaft 20.

Figure 4:
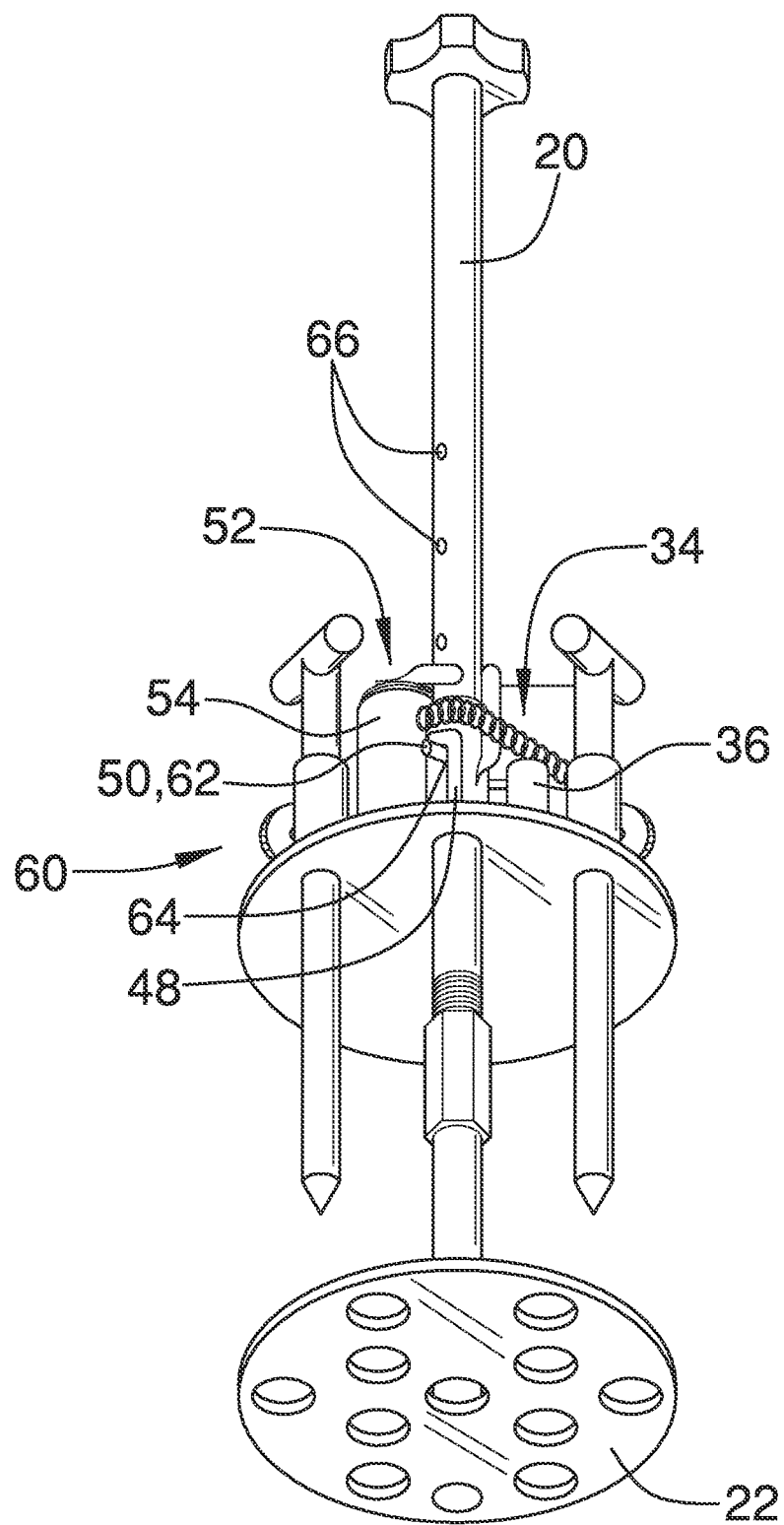
FIG. 4 is a bottom isometric view of an embodiment of the disclosure.

In some embodiments, the pin 62 may also function as the stop arm 50. For example, the pin 62 may extend outwardly from the trigger sleeve 40 far enough to collide with the stop hook 48, as shown in FIG. 4. In some embodiments, such as those shown in FIGS. 7 and 8, the pin 62 may further function as the sleeve arm 42, extending outwardly from the trigger sleeve 40 to engage the trigger 38 and the spring 44. In the open position 24, the trigger 38 contacts the sleeve arm 42, or pin 62, which is coupled to the spring 44. When the rotation solenoid 36 releases the trigger 38, the trigger 38 disengages from the sleeve arm 42, allowing the spring 44 to pivot the trigger sleeve 40 and main shaft 20 to the closed position 26.

The ice fishing trap device 10 may further include a cover 68 having a top wall 70 and a peripheral wall 72 that is attached to and extending downwardly from the top wall 70 defining an interior space. The peripheral wall 72 has a bottom edge 74 defining an opening extending into the interior space. The bottom edge 74 is removably couplable to the upper plate 12. The trigger assembly 30 and the attachment 60 are positioned within the interior space when the bottom edge 74 is coupled to the upper plate 12.

In some embodiments, the cover 68 is configured to inhibit penetration of water or other fluid 128 into the interior space when the bottom edge 74 is coupled to the upper plate 12. For example, any openings in the cover 68 may be sealed to reduce or inhibit fluid 128 from flowing into the interior space.

The top wall 70 has a top wall aperture 76 extending through the top wall 70 into the interior space. The top wall aperture 76 is aligned with the upper plate aperture 18 and the main shaft 20 extends upwardly through the top wall aperture 76 when the bottom edge 74 is coupled to the upper plate 12.

Each of the cover 68 and the upper plate 12 is movably coupled to the main shaft 20 whereby the cover 68 and the upper plate 12 are configured to slide vertically along the main shaft 20 and wherein the main shaft 20 is configured to rotate within the top wall aperture 76 and the upper plate aperture 18.

A charging port 114 may be positioned inset to the peripheral wall 74 and exposed within the peripheral wall 74. The charging port 114 may alternatively be positioned inset to and exposed within the top wall 70. The charging port 114 is operationally coupled to the power source 32 and configured to receive a charging cord, for example to recharge the rechargeable battery.

A knob 78 may be coupled to a top end 80 of the main shaft 20 such that rotation of the knob 78 rotates the main shaft 20. As shown in FIG. 1, the knob 78 is generally positioned above the cover 68 when the cover 68 is coupled to the upper plate 12.

A switch 82 may be mounted on the top wall 70. The switch 82 is electronically coupled to the power source 32. The actuation of the switch 82 actuates the power source 32 thereby actuating the rotation mechanism 34 and the lift mechanism 52.

An extension mechanism 84 may be coupled to a bottom end 86 of the main shaft 20. The extension mechanism 84 removably couples the main shaft 20 with either the trap plate 22 or an extension shaft 88. When the main shaft 20 is coupled with the extension shaft 88, the trap plate 22 is coupled to the extension shaft 88 and the length of the main shaft 20 is effectively increased by the length of the extension shaft 88. In one example, this extension mechanism 84 enables the ice fishing trap device 10 to be used where the ice is particularly thick over the body of water 126.

The extension shaft 88 generally has a first side 90 and a second side 92. The extension shaft 88 has a first end 91 on the first side 90 and a second end 93 on the second side 92. The second end 93 of the second side 92 has a diameter configured to complement a diameter of a one of the plurality of plate holes 94 extending through the trap plate 22 whereby the one of the plurality of plate holes 94 engages the end second end 93 of second side 92 thereby securing the trap plate 22 to the extension shaft 88.

The first side 90 of the extension shaft 88 has a first threading 94 and the bottom end 86 of the main shaft 20 has a shaft threading 98. The first threading 94 is complementary to the shaft threading 98 such that the extension shaft 88 is threadably couplable to the main shaft 20, thereby increasing the length of the main shaft 20.

The bottom end 86 of the main shaft 20 may also have a diameter configured to complement the diameter of the one of the plurality of plate holes 94 extending through the trap plate 22 whereby the one of the plurality of plate holes 94 engages the bottom end 86 thereby securing the trap plate 22 to the main shaft 20. In this embodiment, the trap plate 22 may snap or clip onto either the bottom end 86 of the main shaft 20 or the second side 92 of the extension shaft 88. For example, because the one of the plurality of plate holes 94 has a diameter configured to complement a diameter of the bottom end 86 of the main shaft 20 and the second end 93 of the extension shaft 88, the trap plate 22 can engage either the bottom end 86 or the second end 93 and remain coupled to the main shaft 20 or the extension shaft 88, respectively, through a friction fit.

In another embodiment, the trap plate 22 may threadably couple with either the bottom end 86 of the main shaft 20 or the second side 92 of the extension shaft 88. For example, the trap plate 22 may have a plate threading surrounding an inner surface of the one of the plurality of plate holes 94. The shaft threading 98 on the bottom end 86 of the main shaft 20 may be complementary to the plate threading such that the trap plate 22 is threadably couplable to the main shaft 20. The second threading 100 on the second side 92 of the extension shaft 88 may also be complementary to the plate threading such that the second side 92 is threadably couplable with the trap plate 22.

The ice fishing trap device 10 may further include a support 102 that is coupled to the upper plate 12. The support 102 is configured to stabilize the upper plate 12 over the ice 124 adjacent to the ice hole 120. In some embodiments, the support may include a spike 104 having a tip portion 106 extending downwardly from the upper plate 12. The tip portion 106 is generally pointed because the tip portion 106 is configured for insertion into the upper surface 122 of the ice 124 thereby supporting the upper plate 12 over the ice 124. The spike 104 also has a handle portion 108 extending upwardly from the upper plate 12. When the cover 68 is coupled to the upper plate 12, the handle portion 108 may be positioned in the interior space. A handle 110 is affixed to the handle portion 108. The spike 104 is slidably coupled to the upper plate 12, wherein the spike 104 is vertically movable relative to the upper plate 12. A clamp 112 is coupled to the spike 104. The clamp 112 tightens around the spike 104 to fix a position of the spike 104 relative to the upper plate 12.

In use, the ice fishing trap device 10 can be positioned on the upper surface 122 of the ice 124 adjacent to the ice hole 120, as shown in FIGS. 9-11. To set the trap, the knob 78 can be used to rotate the trap plate 22 into the open position 24 shown in FIG. 9. Once a fish 130 is caught on the line, a fisher can use the switch 82 on top of the cover 68 to actuate the trigger assembly 30. The rotation mechanism 34 will pivot the trap plate 22 from the open position 24 to the closed position 26 shown in FIG. 10. Then, the lift mechanism 52 will raise the trap plate 22 upwardly toward the upper plate 12 and into the ice hole 120. The fish 130 will then be inhibited from escaping back into the body of water 126, even if the fish 130 escapes from the line. The ice fishing trap device 10 can also be used to catch other items which may fall into the ice hole 120, such as keys or wallets.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fish trapping apparatus comprising:
   an upper plate having an upper plate aperture extending through the upper plate;
   a main shaft being positioned in the upper plate aperture, the main shaft being movably coupled to the upper plate whereby the main shaft moves vertically relative to the upper plate;
   a trap plate being coupled to the main shaft below the upper plate, wherein rotation of the main shaft rotates the trap plate, the trap plate rotating 180.0° between an open position and a closed position, wherein the trap plate is aligned with the upper plate when the trap plate is in the open position;
   the upper plate being configured to be positioned adjacent to an ice hole extending through an upper surface of ice over a body of water, the main shaft being configured to be positionable to extend through the ice hole into the body of water below the ice hole such that the trap plate is positioned in the body of water and aligned with the upper plate when the trap plate is in the open position, the trap plate being configured to be offset from the upper plate and positioned within the ice hole when the trap plate is in the closed position;
   a trigger assembly being mounted on the upper plate, the trigger assembly rotating the trap plate from the open position to the closed position and moving the main shaft upwardly relative to the upper plate, the trigger assembly comprising:
      a power source being coupled to the upper plate;
      a rotation mechanism being configured to rotate the main shaft whereby the trap plate is rotated to the closed position; and
      a lift mechanism being configured to lift the main shaft upwardly toward the upper plate when the trap plate is in the closed position.

2. The fish trapping apparatus of claim 1, wherein the trap plate has a plurality of plate holes extending therethrough, the plurality of plate holes being configured to permit a fluid to flow through the plurality of plate holes when the trap plate moves through the body of water.

3. The fish trapping apparatus of claim 1, the rotation mechanism further comprising:
   a rotation solenoid being coupled to the upper plate, the rotation solenoid being actuated by the power source;
   a trigger being coupled to the rotation solenoid, the trigger extending outwardly from the rotation solenoid;
   a trigger sleeve being coupled to the main shaft, the trigger sleeve extending around the main shaft;
   a sleeve arm being attached to and extending outwardly from the trigger sleeve;
   a spring being coupled to the upper plate and the sleeve arm, the spring extending around the trigger sleeve when the trap plate is in the open position, the spring being tensioned by the trigger to retain the open position until the rotation solenoid is actuated; and
   wherein the trigger contacts the spring when the trap plate is in the open position, and wherein the rotation solenoid releases the trigger from the spring thereby turning the main shaft to the closed position.

4. The fish trapping apparatus of claim 3, the rotation mechanism further comprising a stop being coupled to the upper plate and the trigger sleeve to inhibit the main shaft from turning more than 180.0° when the rotation solenoid releases the trigger from the spring.

5. The fish trapping apparatus of claim 4, the stop mechanism further comprising:
   a stop hook being coupled to and extending upwardly from the upper plate;
   a stop arm extending outwardly from the trigger sleeve, the stop arm being aligned with the stop hook when the trap plate is in the closed position; and
   the stop arm colliding with the stop hook to stop turning the main shaft once the trap plate is in the closed position.

6. The fish trapping apparatus of claim 3, further comprising an attachment coupling the upper plate to the main shaft, the attachment releasably securing the upper plate at a selected position relative to the main shaft, the attachment including:
   a pin;
   the trigger sleeve having a pair of pin apertures extending therethrough, the pair of pin apertures being aligned with one another along a transverse plane, the pair of pin apertures being configured to receive the pin;
   the main shaft having a plurality of pin holes extending therethrough, the plurality of pinholes being arranged along a length of the main shaft, each of the plurality of pin holes being configured to receive the pin when a one of the plurality of pin holes is aligned with the pair of pin apertures; and
   wherein insertion of the pin through the pair of pin apertures and the one of the plurality of pin holes releasably secures the upper plate to the main shaft.

7. The fish trapping apparatus of claim 6, wherein the plurality of pin holes are being spaced from each other by 2.0 inches.

8. The fish trapping apparatus of claim 1, the lift mechanism further comprising:
   a lift solenoid being coupled to the upper plate, the lift solenoid being actuated by the power source;
   a rod being telescopically coupled to the lift solenoid, the rod being nested within the lift solenoid such that the rod extends upwardly from the lift solenoid when the lift solenoid is actuated by the power source; and
   a lift hook being coupled to the main shaft, the lift hook extending outwardly from the main shaft, the hook being aligned with the rod when the trap plate is in the closed position, the rod contacting and lifting the lift hook thereby lifting the main shaft upwardly toward the upper plate.

9. The fish trapping apparatus of claim 1, further comprising a cover having a top wall and a peripheral wall being attached to and extending downwardly from the top wall defining an interior space, the peripheral wall having a bottom edge defining an opening extending into the interior space, the bottom edge being removably couplable to the upper plate, wherein the trigger assembly is positioned within the interior space when the bottom edge is coupled to the upper plate.

10. The fish trapping apparatus of claim 9, wherein the top wall has a top wall aperture extending therethrough, the top wall aperture being aligned with the upper plate aperture and the main shaft extending upwardly through the top wall aperture when the bottom edge is coupled to the upper plate.

11. The fish trapping apparatus of claim 9, further comprising a switch being mounted on the top wall, the switch being electronically coupled to the power source, wherein actuation of the switch actuates the power source thereby actuating rotation mechanism and the lift mechanism.

12. The fish trapping apparatus of claim 1, further comprising a knob being coupled to a top end of the main shaft such that rotation of the knob rotates the main shaft.

13. The fish trapping apparatus of claim 1, further comprising an extension mechanism being coupled to a bottom end of the main shaft, the extension mechanism removably coupling the main shaft with the trap plate and an extension shaft thereby increasing a length of the main shaft.

14. The fish trapping apparatus of claim 13, the extension mechanism further comprising:
 the extension shaft having a first side and a second side, the second side having a diameter configured to complement a diameter of one of the plurality of plate holes extending through the trap plate whereby the one of the plurality of plate holes engages the second side thereby securing the trap plate to the extension shaft; and
 the first side having a first threading and the bottom end of the main shaft having a shaft threading, the first threading being complementary to the shaft threading such that the extension shaft is threadably couplable to the main shaft.

15. The fish trapping apparatus of claim 1, further comprising a support being coupled to the upper plate, the support being configured to stabilize the upper plate over the ice adjacent to the ice hole.

16. The fish trapping apparatus of claim 15, the support further comprising:
 a spike having a handle portion and a tip portion, the tip portion extending downwardly from the upper plate, the tip portion being pointed, the tip portion being configured for insertion into the upper surface of the ice thereby supporting the upper plate over the ice;
 the handle portion extending upwardly from the upper plate into the interior space;
 a handle being affixed to the handle portion;
 the spike being slidably coupled to the upper plate, wherein the spike is vertically movable relative to the upper plate; and
 a clamp being coupled to the spike, the clamp fixing a position of the spike relative to the upper plate.

17. A fish trapping apparatus comprising:
 an upper plate having a top side and a bottom side, the upper plate having an upper plate aperture extending into the top side and outwardly through the bottom side;
 a main shaft being positioned in the upper plate aperture, the main shaft being movably coupled to the upper plate whereby the main shaft moves vertically relative to the upper plate;
 a trap plate being coupled to the main shaft below the upper plate, wherein rotation of the main shaft rotates the trap plate, the trap plate rotating 180.0° between an open position and a closed position, wherein the trap plate is aligned with the upper plate when the trap plate is in the open position;
 the upper plate being configured to be positioned adjacent to an ice hole extending through an upper surface of ice over a body of water, the main shaft being configured to be positionable to extend through the ice hole into the body of water below the ice hole such that the trap plate is positioned in the body of water and aligned with the upper plate when the trap plate is in the open position, the trap plate being configured to be offset from the upper plate and positioned within the ice hole when the trap plate is in the closed position;
 the trap plate having a plurality of plate holes extending therethrough, the plurality of plate holes being configured to permit a fluid to flow through the plurality of plate holes when the trap plate moves through the body of water;
 a trigger assembly being mounted on the upper plate, the trigger assembly rotating the trap plate from the open position to the closed position and moving the main shaft upwardly relative to the upper plate, the trigger assembly comprising:
  a power source being coupled to the top side of the upper plate, the power source being a rechargeable battery;
  a rotation mechanism being configured to rotate the main shaft whereby the trap plate is rotated to the closed position, the rotation mechanism including:
   a rotation solenoid being coupled to the upper plate, the rotation solenoid being actuated by the power source;
   a trigger being coupled to the rotation solenoid, the trigger extending outwardly from the rotation solenoid;
   a trigger sleeve being coupled to the main shaft, the trigger sleeve extending around the main shaft;
   a sleeve arm being attached to and extending outwardly from the trigger sleeve;
   a spring being coupled to the upper plate and the sleeve arm, the spring extending around the trigger sleeve when the trap plate is in the open position, the spring being tensioned by the trigger to retain the open position until the rotation solenoid is actuated;
   wherein the trigger contacts the spring when the trap plate is in the open position, and wherein the rotation solenoid releases the trigger from the spring thereby turning the main shaft to the closed position;
  a stop being coupled to the upper plate and the trigger sleeve to inhibit the main shaft from turning more than 180.0° when the rotation solenoid releases the trigger from the spring, the stop comprising:
   a stop hook being coupled to and extending upwardly from the upper plate;
   a stop arm extending outwardly from the trigger sleeve, the stop arm being aligned with the stop hook when the trap plate is in the closed position;
   the stop arm colliding with the stop hook to stop turning the main shaft once the trap plate is in the closed position;
 a lift mechanism being configured to lift the main shaft upwardly toward the upper plate when the trap plate is in the closed position, the lift mechanism including:
  a lift solenoid being coupled to the upper plate, the lift solenoid being actuated by the power source;
  a rod being telescopically coupled to the lift solenoid, the rod being nested within the lift solenoid such that the rod extends upwardly from the lift solenoid when the lift solenoid is actuated by the power source;

a lift hook being coupled to the main shaft, the lift hook extending outwardly from the main shaft, the lift hook being aligned with the rod when the trap plate is in the closed position, the rod contacting and lifting the lift hook thereby lifting the main shaft upwardly toward the upper plate;

an attachment coupling the upper plate to the main shaft, the attachment releasably securing the upper plate at a selected position relative to the main shaft, the attachment comprising:

a pin;

the trigger sleeve having a pair of pin apertures extending therethrough, the pair of pin apertures being aligned with one another along a transverse plane, the pair of pin apertures being configured to receive the pin;

the main shaft having a plurality of pin holes extending therethrough, the plurality of pinholes being arranged along a length of the main shaft, each of the plurality of pin holes being configured to receive the pin when a one of the plurality of pin holes is aligned with the pair of pin apertures, the plurality of pin holes being spaced relative to one another by 2.0 inches;

wherein insertion of the pin through the pair of pin apertures and the one of the plurality of pin holes releasably secures the upper plate to the main shaft;

a cover having a top wall and a peripheral wall being attached to and extending downwardly from the top wall defining an interior space, the peripheral wall having a bottom edge defining an opening extending into the interior space, the bottom edge being removably couplable to the upper plate, wherein the trigger assembly and the attachment are positioned within the interior space when the bottom edge is coupled to the upper plate;

the top wall having a top wall aperture extending therethrough, the top wall aperture being aligned with the upper plate aperture and the main shaft extending upwardly through the top wall aperture when the bottom edge is coupled to the upper plate;

wherein each of the cover and the upper plate is movably coupled to the main shaft whereby the cover and the upper plate are configured to slide vertically along the main shaft;

a knob being coupled to a top end of the main shaft such that rotation of the knob rotates the main shaft;

a switch being mounted on the top wall, the switch being electronically coupled to the power source, wherein actuation of the switch actuates the power source thereby actuating the rotation mechanism and the lift mechanism;

an extension mechanism being coupled to a bottom end of the main shaft, the extension mechanism removably coupling the main shaft with the trap plate and an extension shaft thereby increasing the length of the main shaft, the extension mechanism including:

the extension shaft having a first side and a second side, the second side having a diameter configured to complement a diameter of one of the plurality of plate holes extending through the trap plate whereby the one of the plurality of plate holes engages the second side thereby securing the trap plate to the extension shaft;

the first side having a first threading and the bottom end of the main shaft having a shaft threading, the first threading being complementary to the shaft threading such that the extension shaft is threadably couplable to the shaft;

a support being coupled to the upper plate, the support being configured to stabilize the upper plate over the ice hole adjacent to the ice hole, the support including:

a spike having a handle portion and a tip portion, the tip portion extending downwardly from the upper plate, the tip portion being pointed, the tip portion being configured for insertion into the upper surface of the ice thereby supporting the upper plate over the ice;

the handle portion extending upwardly from the upper plate into the interior space;

a handle being affixed to the handle portion;

the spike being slidably coupled to the upper plate, wherein the spike is vertically movable relative to the upper plate; and a clamp being coupled to the spike, the clamp fixing a position of the spike relative to the upper plate.

\* \* \* \* \*